United States Patent
Pellegatti et al.

(10) Patent No.: US 8,796,385 B2
(45) Date of Patent: Aug. 5, 2014

(54) SOFT AND FLEXIBLE POLYOLEFIN COMPOSITIONS

(75) Inventors: Giampaolo Pellegatti, Boara (IT); Paolo Goberti, Vigarano Mainarda (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 12/734,849

(22) PCT Filed: Dec. 9, 2008

(86) PCT No.: PCT/EP2008/067051
§ 371 (c)(1),
(2), (4) Date: May 27, 2010

(87) PCT Pub. No.: WO2009/080485
PCT Pub. Date: Jul. 2, 2009

(65) Prior Publication Data
US 2010/0305276 A1    Dec. 2, 2010

Related U.S. Application Data

(60) Provisional application No. 61/008,475, filed on Dec. 20, 2007.

(30) Foreign Application Priority Data

Dec. 19, 2007  (EP) .................................. 07150111

(51) Int. Cl.
C08L 23/08 (2006.01)
C08L 23/14 (2006.01)
C08L 23/16 (2006.01)

(52) U.S. Cl.
USPC .......................................... 525/240; 525/191

(58) Field of Classification Search
USPC ................................................ 525/191, 240
See application file for complete search history.

(56) References Cited

U.S. PATENT DOCUMENTS

| | | |
|---|---|---|
| 4,399,054 A | 8/1983 | Ferraris et al. |
| 5,055,438 A | 10/1991 | Canich |
| 5,095,153 A | 3/1992 | Agnes et al. |
| 5,145,819 A | 9/1992 | Winter et al. |
| 5,286,564 A | 2/1994 | Cecchin et al. |
| 5,324,800 A | 6/1994 | Welborn et al. |
| 5,580,939 A | 12/1996 | Welborn et al. |
| 5,633,394 A | 5/1997 | Welborn et al. |
| 5,703,187 A | 12/1997 | Timmers |
| 6,013,819 A | 1/2000 | Stevens et al. |
| 6,075,077 A | 6/2000 | Timmers et al. |
| RE37,384 E | 9/2001 | Winter et al. |
| 6,686,488 B2 | 2/2004 | Wilson et al. |
| 6,743,864 B2 * | 6/2004 | Glogovsky et al. ........... 525/191 |
| 6,806,326 B2 | 10/2004 | Stevens et al. |
| 6,858,557 B1 | 2/2005 | Stevens |
| 6,884,857 B1 | 4/2005 | Stevens et al. |
| 7,022,640 B2 | 4/2006 | Morini et al. |
| 7,049,377 B1 | 5/2006 | Morini et al. |
| 7,125,924 B2 | 10/2006 | Credali et al. |
| 7,138,469 B2 | 11/2006 | Collina et al. |
| 7,205,364 B1 | 4/2007 | Canich |
| 7,569,646 B1 | 8/2009 | Canish |
| 7,592,393 B2 | 9/2009 | Pelliconi et al. |
| 8,008,400 B2 | 8/2011 | Ennis et al. |
| 2004/0198919 A1 | 10/2004 | Garagnani et al. |
| 2005/0222314 A1 | 10/2005 | Credali et al. |
| 2006/0194924 A1 | 8/2006 | Pelliconi |
| 2007/0161747 A1 * | 7/2007 | Maier et al. ................... 525/191 |
| 2009/0270560 A1 | 10/2009 | Bacci et al. |

FOREIGN PATENT DOCUMENTS

| | | |
|---|---|---|
| EP | 45977 | 2/1982 |
| EP | 643066 | 3/1995 |
| EP | 671404 | 9/1995 |
| JP | 56079138 | 6/1981 |
| WO | WO 03011962 A1 * | 2/2003 |

OTHER PUBLICATIONS

US 5,168,111, 12/1992, Canich (withdrawn).
Japanese Office Action—Mailed May 22, 2013 for Corresponding Application No. 2010-538564.
China Office Action—Mailed June 4, 2012 for Corresponding Application No. 200880121776.1.

* cited by examiner

Primary Examiner — Irina S Zemel
Assistant Examiner — Jeffrey Lenihan

(57) ABSTRACT

A polyolefin composition having unusually low values of flexural modulus and shore hardness and comprising, in percent by weight: A) 15-40% of a copolymer of propylene with hexene-1 containing from 2.5 to 10% of hexene-1 and having Melt Flow Rate (MFR, measured according to ISO 1133, 230° C./2.16 Kg) from 0.5 to 100 g/10 min.; and B) 60-85% of an ethylene copolymer containing ethylene in a quantity equal to or lower than 40%, and having solubility in xylene at room temperature greater than 70%.

7 Claims, No Drawings

SOFT AND FLEXIBLE POLYOLEFIN COMPOSITIONS

This application claims priority to European Patent Application 07150111.8 filed 19 Dec. 2007 and provisional U.S. Appl. No. 61/008,475 filed 20 Dec. 2007; the disclosures of European Application 07150111.8 and U.S. Appl. No. 61/008,475, each as filed, are incorporated herein by reference.

The present invention relates to a thermoplastic polyolefin composition having unusually low values of flexural modulus and shore hardness, and improved tensile properties.

Polyolefin compositions having high flexibility while maintaining a good thermoplastic behaviour are disclosed in the art. They have been used in many application fields, due to the valued properties which are typical of polyolefins (such as chemical inertia, mechanical properties and nontoxicity).

In particular, EP-A-472 946 describes flexible elastoplastic polyolefin compositions comprising, in parts by weight:
A) 10-50 parts of an isotactic propylene homopolymer or copolymer;
B) 5-20 parts of an ethylene copolymer fraction, insoluble in xylene at room temperature; and
C) 40-80 parts of an ethylene copolymer fraction containing less than 40% by weight of ethylene, said fraction being also soluble in xylene at room temperature, and having an intrinsic viscosity from 1.5 to 4 dl/g;
with a percentage by weight of the sum of the (B) and (C) fractions with respect to the total polyolefin composition from 50% to 90%, and a (B)/(C) weight ratio lower than 0.4.

Said compositions show a flexural modulus of less than 150 MPa and low values of Shore hardness.

WO03/011962 describes soft polyolefin compositions comprising the following components, all percent amounts being by weight:
A) 8-25% of a propylene homopolymer or copolymer;
B) 75-92% of an elastomeric fraction comprising a first and a second elastomeric copolymer of propylene with other α-olefin(s), in a weight ratio from 1:5 to 5:1, said copolymers containing 45% or less of such α-olefin(s) and having specified values of solubility in xylene at room temperature and of intrinsic viscosity of the xylene-soluble fraction.

Such compositions show even lower values of flexural modulus, with respect to the compositions disclosed in EP-A-472 946.

However the tensile properties of the said compositions, with particular reference to the tensile stress at break, could still be improved. Higher values of tensile properties would be desirable, in particular for applications in the field of geomembranes and roofing membranes.

It has now surprisingly been found that an unusual and favorable balance of flexibility (low flexural modulus), softness and tensile properties is obtained when a specific copolymer of propylene with hexene-1 is used in combination with an ethylene copolymer having a high solubility in xylene at room temperature.

Thus the present invention provides a polyolefin composition comprising the following components, all percent amounts being by weight:
A) 15-40%, preferably 21-35%, more preferably 25-35%, in particular 26-35%, of a copolymer of propylene with hexene-1 containing from 2.5 to 10%, preferably from 6 to 10% of hexene-1 and having Melt Flow Rate (MFR, measured according to ISO 1133, 230° C./2.16 kg, i.e. at 230° C. with 2.16 kg load) from 0.5 to 100 g/10 min. preferably from 0.5 to 70 g/10 min., more preferably from 2 to 70 g/10 min., in particular from 3 to 70 g/10 min.;
B) 60-85%, preferably 65-79%, more preferably 65-75%, in particular 65-74%, of a copolymer of ethylene with propylene or a $CH_2$=CHR α-olefin, where R is a $C_2$-$C_8$ alkyl radical, and optionally minor quantities of a diene, or a copolymer of ethylene with propylene and said α-olefin, and optionally minor quantities of a diene, said copolymers containing ethylene in a quantity equal to or lower than 40%, preferably from 15 to 40%, more preferably from 15 to 37%, and having solubility in xylene at room temperature greater than 70%, preferably greater than 80%, more preferably greater than 85%.

The said amounts of (A) and (B) are referred to the total weight of the polymeric portion of the polyolefin composition.

In the present description room temperature refers to a temperature around 25° C. Preferably the fraction of the total composition which is soluble in xylene at room temperature has an intrinsic viscosity from 1.5 to 6.5 dl/g.

The copolymer (A) can contain other comonomers, selected in particular from ethylene and $CH_2$=CHR α-olefins where R is a $C_2$-$C_8$ alkyl radical, hexene-1 excluded, provided that the final properties of the composition are not substantially worsened. Examples of the said $CH_2$=CHR α-olefins are butene-1,4-methyl-1-pentene, octene-1. Among the other comonomers, ethylene is preferred.

In the case of copolymer (B) also hexene-1 is comprised in the said definition of $CH_2$=CHR α-olefin. Ethylene is again the preferred comonomer.

Indicatively, when present, the total amount of comonomer(s) different from propylene and hexene-1 in copolymer (A) is from 0.1 to 3% by weight, referred to the total weight of the copolymer.

From the above definition, it is evident that the term "copolymer" includes polymers containing more than one kind of comonomers, such as terpolymers.

Whenever present, the amount of diene in copolymer (B) is preferably from 1 to 10% by weight with respect to the total weight of copolymer (B). Examples of dienes are butadiene, 1,4-hexadiene, 1,5-hexadiene, and ethylidene-1-norbornene.

Moreover, the copolymer (A) is typically semicrystalline, as it has a crystalline melting point, and has a stereoregularity of isotactic type.

Preferably, said copolymer exhibits at least one of the following features:
  a solubility in xylene at room temperature below 30% by weight, preferably below 16% by weight;
  melting temperature from 125 to 150° C., more preferably from 130 to 150° C.

The copolymer (B) has preferably a density from 0.855 to 0.885 g/cm³.

The copolymers (A) and (B) can be obtained with polymerization processes carried out in the presence of stereospecific Ziegler-Natta catalysts supported on magnesium dihalides, in particular magnesium dichloride.

The polymerization process, which can be continuous or batch, is carried out following known techniques and operating in liquid phase, in the presence or not of inert diluent, or in gas phase, or by mixed liquid-gas techniques.

Polymerization reaction time, pressure and temperature are not critical, however it is best if the temperature is from 20 to 100° C. The pressure can be atmospheric or higher.

The regulation of the molecular weight, resulting into the said Melt Flow Rate values, is carried out by using known regulators, hydrogen in particular.

The said stereospecific polymerization catalysts comprise the product of the reaction between:
1) a solid component, containing a titanium compound and an electron-donor compound (internal donor) supported on magnesium dihalide (preferably chloride);
2) an aluminum alkyl compound (cocatalyst); and, optionally,
3) an electron-donor compound (external donor).

Said catalysts are preferably capable of producing homopolymers of propylene having an isotactic index higher than 90% (measured as weight amount of the fraction insoluble in xylene at room temperature).

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European patent 45977.

Particularly suited among the said electron-donor compounds are phthalic acid esters and succinic acid esters.

Suitable succinic acid esters are represented by the formula (I):

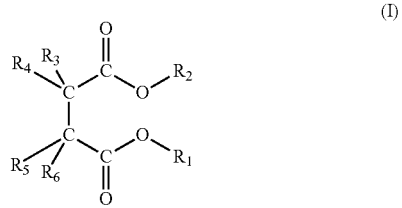

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (1) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred. Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical).

Examples of the said silicon compounds are those of formula $R_a^1 R_b^2 Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

Thexyltrimethoxysilane (2,3-dimethyl-2-trimethoxysilylbutane) is particularly preferred. In particular, thexyltrimethoxysilane is preferably used for preparing the copolymer (A). The previously said 1,3-diethers are also suitable to be used as external donors. In the case that the internal donor is one of the said 1,3-diethers, the external donor can be omitted. Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145, 819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the copolymer (B).

The catalysts may be precontacted with small quantities of olefin (prepolymerization), maintaining the catalyst in supension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

The composition of the present invention can be prepared by mixing copolymers (A) and (B) in the fluid state, i.e., at temperatures greater than their softening or melting point, or by sequential polymerization in two or more stages in the presence of the previously said highly stereospecific Ziegler-Natta catalysts and/or metallocene-type catalysts.

The above mentioned sequential polymerization process for the production of the composition of the present invention generally comprises at least two stages, where in the first stage or stages propylene and hexene-1 are polymerized, optionally in the presence of ethylene and/or said α-olefin as comonomer(s), to form copolymer (A), and in the subsequent stage(s) mixtures of ethylene/propylene and/or an other α-olefin and optionally a diene are polymerized to form copolymer (B). The sequential polymerization is carried out in either liquid, gas, or liquid/gas phase.

It is preferable to carry out the polymerization in gas phase.

The reaction temperature in the various stages of polymerization can be equal or different, and generally ranges from 40 to 90° C., preferably from 50 to 80° C. for copolymer (A), and from 40 to 60° C. for copolymer (B).

Examples of sequential polymerization processes are described in the already cited published European patent application EP-A-0472946.

Examples of preparation of the copolymer (B) in a single step polymerization in hydrocarbon solution are described in WO2007/057361.

The MFR values, measured according to ISO 1133, at 230° C./2.16 kg of the composition of the present invention are generally from 0.4 to 30 g/10 min, preferably from 0.6 to 15 g/10 min.

The desired MFR values for the composition of the present invention can be obtained directly in polymerization, as previously mentioned, by adequately regulating the molecular weight regulator (hydrogen, for example), or can be obtained by subjecting said polymer components or composition to visbreaking Said polymer chain scissioning or visbreaking is carried out by using well known techniques. One of them consists of using peroxides which are added in sufficient quantities to the polymer or polymer composition to provide the desired degree of visbreaking, upon heating, generally in an extruder.

The peroxides which are most conveniently used in the polymer or polymer composition visbreaking process have a decomposition temperature preferably ranging from 150° C. to 250° C. Examples of said peroxides are di-tert-butyl peroxide, dicumyl peroxide, 2,5-dimethyl-2,5-di(tert-butylperoxy)hexyne and Luperox 101 2,5-dimethyl-2,5-di(tert-butylperoxy)hexane, all of which are commercially available.

The quantity of peroxide necessary for the visbreaking process preferably ranges from 0.001 to 1.5% by weight of the polymer or polymer composition, more preferably from 0.002 to 0.6%.

The composition of the present invention can also contain additives, fillers and pigments commonly used for olefin polymers, such as, for example, nucleating agents, extension oils, mineral fillers, organic and inorganic pigments.

As previously mentioned, due to its mechanical properties, the composition of the present invention is particularly suited for the preparation of geomembranes and roofing membranes.

The following examples are given to illustrate the present invention without limiting purpose.

The data relating to the polymeric materials of the examples are determined by way of the methods reported below.

Hexene-1 Content
Determined by IR spectroscopy.
Ethylene Content
Determined by IR spectroscopy.
Butene-1 Content
Determined by IR spectroscopy.
Melt Flow Rate
Determined according to ISO 1183, at 230° C., 2.16 kg (equivalent to ASTM D 1238, condition L).
Solubility in Xylene
2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Melting Temperature (ISO 11357-3)
Determined by differential scanning calorimetry (DSC). A sample weighting 6±1 mg, is heated to 200±1° C. at a rate of 20° C./min and kept at 200±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 200° C.±1. The melting scan is recorded, a thermogram is obtained, and, from this, temperatures corresponding to peaks are read. The temperature corresponding to the most intense melting peak recorded during the second fusion is taken as the melting temperature.
Intrinsic Viscosity (I.V.)
Determined in tetrahydronaphthalene at 135° C.
Density
Determined according to ISO 1183.
Flexural Modulus
Determined according to ISO 178.
Tensile Stress at Break
Determined according to ISO 527.
Shore A and D
Determined according to ISO 868.

EXAMPLE 1

The Propylene Copolymer (A) is Prepared as Follows

The solid catalyst component used in polymerization is a highly stereospecific Ziegler-Natta catalyst component supported on magnesium chloride, containing about 2.2% by weight of titanium and diisobutylphthalate as internal donor, prepared by analogy with the method described in WO03/054035 for the preparation of catalyst component A.

Catalyst System and Prepolymerization Treatment

Before introducing it into the polymerization reactor, the solid catalyst component described above is contacted at 15° C. for 9 minutes with aluminum triethyl (TEAL) and thexyltrimethoxysilane, in a TEAL/thexyltrimethoxysilane weight ratio equal to about 4 and in such quantity that the TEAL/solid catalyst component weight ratio be equal to about 5.

The catalyst system is then subjected to prepolymerization by maintaining it in suspension in liquid propylene at 20° C. for about 30 minutes before introducing it into the polymerization reactor.

Polymerization

The polymerization is carried out in a gas phase polymerization reactor by feeding in a continuous and constant flow the prepolymerized catalyst system, hydrogen (used as molecular weight regulator), propylene and hexene-1 in the gas state.

The main polymerization conditions are:
Temperature: 75° C.
Pressure: 1.6 MPa;
molar ratio $H_2/C3$-:0.0130;
molar ratio $C6$-/($C6$-+$C3$-):0.0650;
residence time:89 minutes.
Note: $C3$-=propylene; $C6$-=hexene-1.

A polymer yield of 3790 g of polymer/g of solid catalyst component is obtained.

The polymer particles exiting the reactor are subjected to a steam treatment to remove the reactive monomers and volatile substances, and then dried.

The resulting propylene copolymer (A) contains 8.1% by weight of hexene-1. Moreover said propylene copolymer (A) has the following properties:

| MFR: | 4.7 g/10 min.; |
|---|---|
| Amount of fraction soluble in xylene: | 13.6% by weight; |
| Melting temperature: | 143° C. |

A composition according to the present invention is prepared by melt blending 30% by weight of the above described copolymer (A) with 70% by weight of a copolymer (B) of propylene with ethylene containing 21% by weight of ethylene and having the following properties:

| Intrinsic viscosity: | 2 dl/g; |
|---|---|
| Amount of fraction soluble in xylene: | 5% by weight; |
| Density: | 0.863 g/cm³. |

Said copolymer (B) is prepared in a single step polymerization carried out in hydrocarbon solution, in the presence of a stereospecific Ziegler-Natta catalyst supported on magnesium dichloride.

The blending step is carried out under nitrogen atmosphere in a twin screw extruder, at a rotation speed of 250 rpm and a melt temperature of 200-250° C. A standard formulation of stabilizers is added to the copolymers (A) and (B) before the blending step, to avoid thermal degradation. Such formulation consists of 0.15% of a blend of Irganox 1010 (pentaerytrityl tetrakis 3-(3,5-di-tert-butyl-4-hydroxyphenyl) propanoate) and Irgafos 168 (tris (2,4-di-tert-butylphenyl) phosphite) and 0.05% of calcium stearate, wherein the amounts are by weight and referred to the total weight of the composition.

The properties of the so obtained composition are reported in Table 1.

COMPARATIVE EXAMPLES 1 and 2

It is operated as in Example 1, but using, in Comparative Example 1, 30% by weight of a copolymer of propylene with ethylene and, in comparative Example 2, 30% by weight of a copolymer of propylene with butene-1, instead of the copolymer (A) used in Example 1.

The copolymer of propylene with ethylene used in Comparative Example 1 contains 3.1% by weight of ethylene and has the following properties:

| MFR: | 5.7 g/10 min.; |
|---|---|
| Amount of fraction soluble in xylene: | 5.6% by weight; |
| Melting temperature: | 145° C. |

The copolymer of propylene with butene-1 used in Comparative Example 1 contains 6% by weight of butene-1 and has the following properties:

| MFR: | 4 g/10 min.; |
|---|---|
| Amount of fraction soluble in xylene: | 1.6% by weight; |
| Melting temperature: | 148° C. |

The properties of the so obtained compositions are reported in Table 1.

TABLE 1

| Properties | Examples | | |
|---|---|---|---|
| | 1 | C. 1 | C. 2 |
| Flexural modulus (MPa) | 45 | 75 | 84 |
| Tensile stress at break (MPa) | 22.1 | 20.8 | 24.7 |
| Shore A | 83.7 | 88 | >90 |
| Shore D | 27 | 33 | 33.5 |

Note;
C. = Comparative Example.

The invention claimed is:

1. A polyolefin composition consisting of the following components, all percent amounts being by weight:
   A) 15-40% of a copolymer of propylene with hexene-1 containing from 2.5 to 10% of hexene-1 and having a melt flow rate, measured according to ISO 1133 at 230° C./2.16 kg, from 0.5 to 100 g/10 min., and having a melting point from 125 to 150° C.; and
   B) 60-85% of a copolymer of ethylene with propylene or a $CH_2$=CHR α-olefin, where R is a $C_2$-$C_8$ alkyl radical, and optionally minor quantities of a diene present in an amount from 1 to 10% by weight, or a copolymer of ethylene with propylene and said α-olefin, and optionally a diene, present in an amount from 1 to 10% by weight, said copolymers containing ethylene in a quantity equal to or lower than 40%, and having a solubility in xylene at room temperature greater than 70%,
   wherein the polyolefin composition has a melt flow rate from 0.6 to 15 g/10 min, measured according to ISO 1133 at 230° C./2.16 kg.

2. The composition of claim 1, containing a fraction soluble in xylene at room temperature having an intrinsic viscosity value from 1.5 to 6.5 dl/g.

3. The composition of claim 1, wherein component A) is prepared by using a stereospecific Ziegler-Natta polymerisation catalyst supported on a magnesium dihalide.

4. A manufactured article comprising the composition of claim 1.

5. The manufactured article of claim 4, in the form of a geomembrane or a roofing membrane.

6. A polyolefin composition consisting of the following components, all percent amounts being by weight:
   A) 26-35% of a copolymer of propylene with hexane-1 containing from 2.5 to 10% of hexene-1 and having a melt flow rate, measured according to ISO 1133 at 230° C./2.16 kg, from 0.5 to 100 g/10 min., and having a melting point from 125 to 150° C.; and
   B) 65-74% of a copolymer of ethylene with propylene or a $CH_2$=CHR α-olefin, where R is a $C_2$-$C_8$ alkyl radical, and optionally a diene present in an amount from 1 to 10% by weight, or a copolymer of ethylene with propylene and said α-olefin, and optionally a diene, present in an amount from 1 to 10% by weight, said copolymers containing ethylene in a quantity equal to or lower than 40%, and having a solubility in xylene at room temperature greater than 70%, the polyolefin composition having a melt flow rate of from 0.6 to 15 g/10 min according to ISO 1133 measured at 230° C./2.16 kg.

7. A manufactured article comprising the polyolefin composition of claim 6, in the form of a geomembrane or a roofing membrane.

* * * * *